United States Patent [19]
Ono et al.

[11] Patent Number: 5,250,614
[45] Date of Patent: Oct. 5, 1993

[54] GRAFT COPOLYMERS AND COATING COMPOSITIONS COMPRISING THE SAME

[75] Inventors: Ichiro Ono, Annaka; Hiroshi Yoshioka, Tokyo, both of Japan

[73] Assignee: Shin-Etsu Chemical Co., Ltd., Tokyo, Japan

[21] Appl. No.: 706,427

[22] Filed: May 28, 1991

[30] Foreign Application Priority Data

Jun. 1, 1990 [JP] Japan .................. 2-144223

[51] Int. Cl.$^5$ ............................. C08L 29/04
[52] U.S. Cl. ......................... 525/58; 525/102
[58] Field of Search ................... 525/58, 102

[56] References Cited

U.S. PATENT DOCUMENTS 3,790,437  2/1974  Haley et al. .................. 525/58
5,045,599  9/1991  Murase .......................... 525/104

FOREIGN PATENT DOCUMENTS 246285  8/1960  Australia .

Primary Examiner—Melvyn I. Marquis
Assistant Examiner—D. Aylward
Attorney, Agent, or Firm—Lowe, Price, LeBlanc & Becker

[57] ABSTRACT

A graft copolymer comprising a stock vinyl polymer comprised of vinyl acetal and vinyl alcohol units and grafted with an organopolysiloxane is described. A coating composition comprising the graft copolymer is also provided.

29 Claims, No Drawings

GRAFT COPOLYMERS AND COATING COMPOSITIONS COMPRISING THE SAME

BACKGROUND OF THE INVENTION

1. Field of the Invention

This invention relates to a novel graft copolymer and more particularly to a polyvinyl acetal resin grafted with an organopolysiloxane. The invention also relates to a coating composition comprising the novel graft copolymer.

2. Description of the Prior Art

Polyvinyl acetal resin is a general term for polyvinyl butyral resins and polyvinyl formal resins, and has features such as (1) capability of forming a flexible film, (2) good adhesion properties, and (3) good dispersability of pigments. Accordingly, the resin has wide utility in the fields of coating binders, ink bases, wash primers, covers for electric wire, general-purpose adhesives, adhesives for printed board, and the like. For the purpose of imparting releasing properties, slip properties, water repellency and the like specific properties to the polyvinyl acetal resin, attempts have been made to introduce silicones into the resin.

However, dimethyl silicone oils are not miscible with polyvinyl acetal resins. When the oil is added to the polyvinyl acetal resin, the resultant film will inconveniently become opaque and the surface properties will become poor. If silicone oils whose miscibility with the resin has been improved by modification with a phenyl group, a long-chain alkyl group, a polyoxyalkyene or the like is added, the above inconvenience may be overcome but with the disadvantage that the releasing properties, slip properties and water repellency do not continue long. To avoid this, attempts have been made to introduce silicone oils having reactive group, such as —NCO, —COOH,

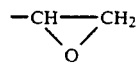

or —SiCl, which are reactive with the hydroxyl groups of the polyvinyl acetal. However, problems occur with the shelf life, and the addition of catalysts or the use of heat is undesirably necessary, thus placing a limit on application.

SUMMARY OF THE INVENTION

It is an object of the invention to provide a novel graft copolymer of a polyvinyl acetal backbone (i.e. a stock polymer) grafted with an organopolysiloxane which has not only good film forming properties, film flexibility and adhesion to various substrates, but also good releasing and slip properties and water repellency continued over a long time.

It is another object of the invention to provide a coating composition comprising the novel graft copolymer of the type mentioned above.

The present invention is based on the finding that when an organopolysiloxane is graft copolymerized with a stock polyvinyl acetal resin, the resultant graft copolymer is imparted with good releasing and slip properties and good water repellency without a sacrifice of film forming properties, film flexibility and adhesion to substrates inherent to the polyvinyl acetal resin backbone. The imparted releasing and slip properties and water repellency are endure for long periods of time.

The above objects of the invention can be achieved, according to the invention, by a novel graft copolymer which comprises a stock polymer comprised of vinyl acetal and vinyl alcohol units and grafted with an organopolysiloxane.

There is also provided according to the invention a coating composition which comprises the graft copolymer dissolved in a solvent therefor.

DETAILED DESCRIPTION AND EMBODIMENTS OF THE INVENTION

The vinyl polymers used as the polyvinyl acetal resin backbone in the graft copolymer may be any known polymers which comprise vinyl acetal and vinyl alcohol units. Preferably, vinyl butyral/vinyl alcohol/vinyl acetate terpolymers and vinyl formal/vinyl alcohol/vinyl acetate terpolymers are used.

Specific and preferred examples of the graft copolymer according to the invention are those of the following general formula

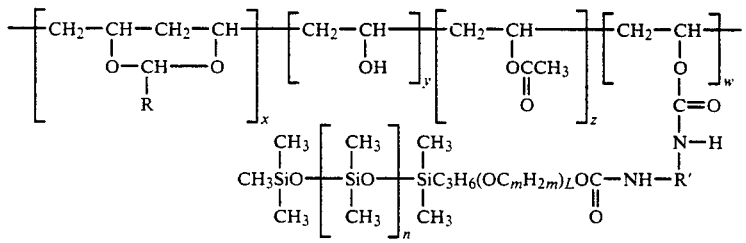

wherein R represents H or $C_3H_7$, R' represents a divalent organic group, L is an integer of from 0 to 50, m is an integer of 2 or 3, n is an integer of from 3 to 100, and $X+Y+Z+W$ is an integer ranging from 200 to 3000.

Examples of R' which is a divalent organic group include those groups indicated below

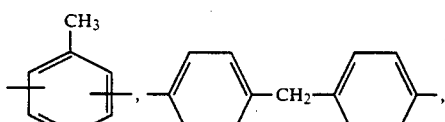

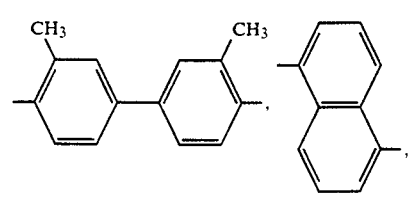

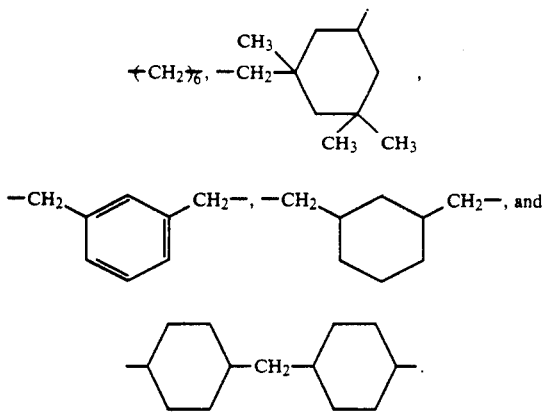

The graft copolymer of the invention can be readily obtained by graft reaction between an organopolysiloxane having an isocyanate group at one terminal end thereof and a polyvinyl acetal resin having hydroxyl groups in the following manner

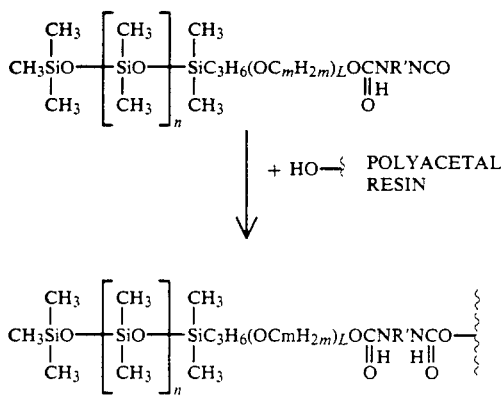

wherein R, R', L, m, n have, respectively, the same meanings as defined above.

The organopolysiloxane terminated at one end thereof with an isocyanate group can be prepared by reaction between a known organopolysiloxane terminated with a hydroxyl group at one end and a diisocyanate compound having two isocyanate groups in the following manner wherein only one of the isocyanate group of the diisocyanate compound takes part in the reaction with the hydroxyl group of the organopolysiloxane

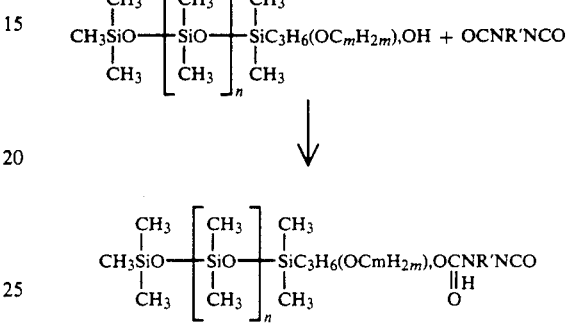

wherein R', L, m and n have, respectively, the same meanings as defined before.

The diisocyanate compounds useful in the present invention include, for example, tolylene diisocyanate, diphenylmethane diisocyanate, tolidine diisocyanate, naphthalene diisocyanate, hexamethylene diisocyanate, isophorone diisocyanate, xylylene diisocyanate, hydrogenated xylylene diisocyanate, hydrogenated diphenylmethane diisocyanate and the like.

Specific and preferable examples of the organopolysiloxane having an isocyanate group terminated at one end include those of the following formulae

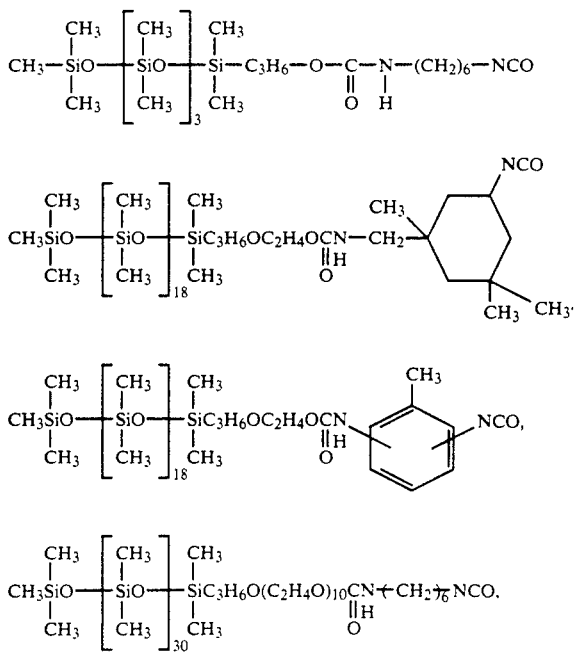

-continued

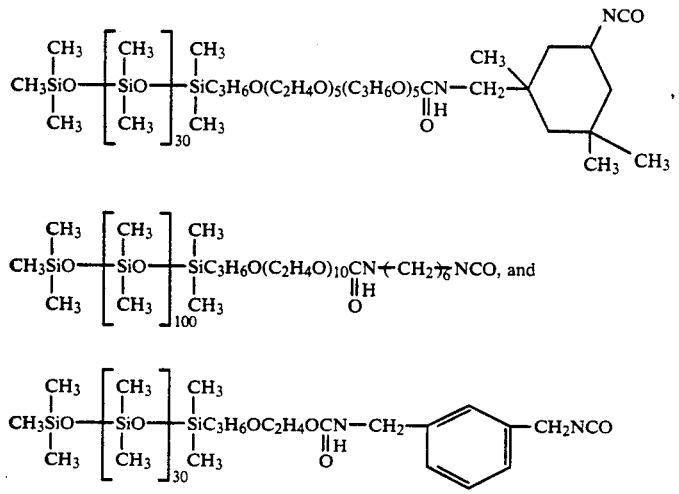

The graft reaction between the isocyanate-bearing organopolysiloxane and the polyvinyl acetal and the reaction between the hydroxyl group-containing organopolysiloxane at one end thereof and the diisocyanate compound, respectively, proceed in a similar way under similar reaction conditions. In the respective reactions, a solvent may or may not be used. In both reactions, the reactions are more likely to control when a solvent is used. Accordingly, these reactions are preferably performed in a solvent.

Examples of the solvent include esters such as methyl acetate, ethyl acetate, butyl acetate, iso-butyl acetate and the like, ketones such as acetone, methyl ethyl ketone, methyl iso-butyl ketone, diisobutyl ketone, cyclohexanone and the like, aromatic hydrocarbons such as benzene, toluene, xylene and the like, ethers such as diethyl ether, dibutyl ether, tetrahydrofuran, dioxane and the like, and mixtures thereof.

In the above reactions, organic tin compounds such as dibutyltin dilaurate, dibutyltin dioctate and the like may be added, if necessary, as a catalyst. The amount of the catalyst is generally in the range of from 0.01 to 1 wt % of the respective reaction systems. By the addition, the reactions may be completed within a short time. In both cases, the reaction temperature is generally in the range of from 50° to 100° C. and the reaction time is in the range of from 2 to 10 hours.

The graft copolymer thus obtained should preferably have a degree of polymerization of from 200 to 3000.

The coating composition of the invention should comprise the graft polymer solution obtained above as an essential component in the form of a solution. Aside from the graft copolymer, resins other than the graft copolymer, solvents, fillers and other various additives may be added depending on the purpose. Solvents which may be added, if necessary, are used to control the viscosity of the solution, drying characteristics and film thickness. The type of solvent is not critical. Useful solvents include not only those indicated before for use in the respective reaction systems, but also alcohols such as methanol, ethanol, iso-propyl alcohol, n-butanol and the like, cellosolves (i.e. ethylene glycol monoalkyl ethers) such as ethylene glycol monomethyl ether, ethylene glycol monoethyl ether, ethylene glycol monobutyl ether and the like. These solvents may be used singly or in combination.

The coating composition of the invention may be a solution of the graft copolymer in a solvent. The concentration of the graft copolymer is not critical and is determined depending on the purpose. Such a solution is useful as a cold drying paint. If polyfunctional isocyanate compounds are formulated as a crosslinking agent, it will be possible to obtain a cold setting paint. The product obtained from the cold setting paint is resistant to solvents.

The polyfunctional isocyanate compounds include, aside from those diisocyanates indicated before, polyisocyanate compounds such as trimethylolpropane-modified tolylenediisocyanate, isocyanate-combined tolylenediisocyanurate, trimethylolpropane-modified hexamethylenediisocyanate, isocyanurate-combined hexamethylenediisocyanate, biuret-combined hexamethylenediisocyanate, trimethylolpropane-modified isophoronediisocyanate, isocyanurate-combined isophoronediisocyanate and the like. The amount of the isocyanate compound is such that the isocyanate group is present in the range of from 0.5 to 2.0 equivalents, preferably from 0.8 to 1.5 equivalents, per unit equivalent of the hydroxyl group of the graft copolymer. In this case, a small amount of an organic tin compound, such as dibutyl tin dioctate, dibutyl tin dilaurate or the like, may be added as a crosslinking promoter.

The coating composition of the invention comprises as a main component the graft copolymer. If necessary, other resins such as phenolic resins, epoxy resins, urethane resins, urea resins, melamine resins, alkyd resins and the like.

Moreover, in order to improve the strength of the film obtained from the composition, inorganic fillers such as silica, alumina, glass powder, clay, talc, calcium carbonate, mica powder, titanium dioxide, wollastonite, magnesium hydroxide and the like. As a matter of course, other additives such as, for example, antioxidants, antistatic agents, colorants and the like may be added.

In the film obtained from the coating composition comprising the graft copolymer, the grafted organopolysiloxane is concentrated in the surface portions of the film. This is considered to be the reason why releasing and slip properties and water repellency develop without a sacrifice of adhesiveness inherent to the polyvinyl acetal resin.

The coating composition of the invention is advantageous in that since the organopolysiloxane is grafted to the polyvinyl acetal resin through a non-hydrolyzing bond, there is no failure in miscibility nor deficiency in durability as will be experienced in prior art counterparts. The film obtained from the composition exhibits good releasing and slip properties and good water repellency, so that the composition is conveniently employed as high-quality paints, binders for magnetic mediums, coatings for heat-sensitive recording films, and releasing and water repellent coatings.

The present invention is more particularly described by way of examples, which should not be construed as limiting the invention.

SYNTHETIC EXAMPLE 1

Preparation of organopolysiloxane having an isocyanate terminated at one end 43.1 g of isophorone diisocyanate, 350 g of ethyl acetate and 0.7 g of dibutyl tin dilaurate were charged into a one-liter glass reactor equipped with a condenser, a thermometer, a dropping funnel and an agitator, followed by heating to 60° C. in a stream of nitrogen. Thereafter, 306.9 g of an organopolysiloxane having a hydroxyl group at one terminal end and represented by the following formula

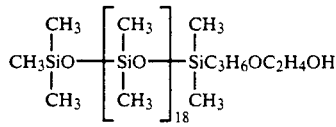

was dropped in the reactor, followed by reaction at a temperature of from 60° to 70° C. for 5 hours and removal of the ethyl acetate under reduced pressure to obtain 336 g of a light yellow, transparent liquid having a viscosity of 360 centistokes and a refractive index of 1.4198. The liquid was subjected to IR spectroscopy and $^1$HNR spectroscopy, revealing that it was an organopolysiloxane having an isocyanate group at one end and represented by the following structural formula

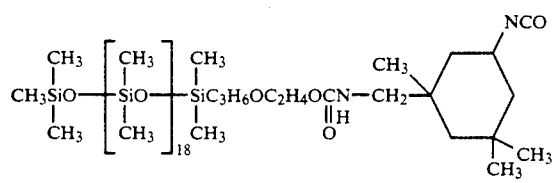

SYNTHETIC EXAMPLES 2 to 5

The general procedure of Synthetic Example 1 was repeated except that isophorone diisocyanate and the organopolysiloxane terminated with the hydroxyl group at one end thereof were changed as indicated in Table 1, thereby obtaining isocyanate-terminated organopolysiloxanes at one end thereof indicated in Table 2.

TABLE 1

| Synthetic Example | Diisocyanate Compound | Hydroxyl Group-terminated Organopolysiloxane at One End |
|---|---|---|
| 2 | isophorone diisocyanate | $CH_3SiO(CH_3)_2-[SiO(CH_3)_2]_3-SiC_3H_6OC_2H_4OH(CH_3)$ |
| 3 | isophorone diisocyanate | $CH_3SiO(CH_3)_2-[SiO(CH_3)_2]_{100}-SiC_3H_6OC_2H_4OH(CH_3)$ |
| 4 | hexamethylene diisocyanate | $CH_3SiO(CH_3)_2-[SiO(CH_3)_2]_{10}-SiC_3H_6OH(CH_3)$ |
| 5 | hexamethylene diisocyanate | $CH_3SiO(CH_3)_2-[SiO(CH_3)_2]_{10}-SiC_3H_6(OC_2H_4)_{10}OH(CH_3)$ |

TABLE 2

| Synthetic Example | Isocyanate-terminated Organopolysiloxane at One End |
|---|---|
| 2 | $CH_3SiO(CH_3)_2-[SiO(CH_3)_2]_3-SiC_3H_6OC_2H_4OCN(H)(O)-CH_2-\text{IPDI}-NCO$ |
| 3 | $CH_3SiO(CH_3)_2-[SiO(CH_3)_2]_{100}-SiC_3H_6OC_2H_4OCN(H)(O)-CH_2-\text{IPDI}-NCO$ |
| 4 | $CH_3SiO(CH_3)_2-[SiO(CH_3)_2]_{18}-SiC_3H_6OCN(H)(O)-(CH_2)_6-NCO$ |
| 5 | $CH_3SiO(CH_3)_2-[SiO(CH_3)_2]_{18}-SiC_3H_6(OC_2H_4)_{10}OCN(H)(O)-(CH_2)_6-NCO$ |

EXAMPLE 1

100 g of a vinyl butyral/vinyl alcohol/vinyl acetate copolymer having an average degree of polymerization of about 800 (available from Denki Chem. Ind. Co., Ltd. under the designation of Denka Butyral #3000-K), 280 g of ethyl acetate and 280 g of toluene were charged into a one-liter glass reactor equipped with a condenser, a thermometer, a dropping funnel and an agitator, followed by heating to 60° C. in a stream of nitrogen. After confirmation of complete dissolution of the resin, 5 g of the isocyanate-terminated organopolysiloxane obtained in Synthetic Example 1 was dropped, followed by reaction at a temperature of from 60° to 70° C. for 8 hours to obtain a light yellow, transparent, viscous liquid. The IR spectroscopy of the thus obtained liquid revealed that not only the absorption at 2,260 cm$^{-1}$ ascribed to the NCO group disappeared, but also absorption peaks at 804 cm$^{-1}$ and 1,260 cm$^{-1}$ were observed. From this, it was confirmed that the liquid was polyvinyl butyral resin grafted with the organopolysiloxane.

EXAMPLES 2 to 7

The general procedure of Example 1 was repeated except that the polyvinyl acetal resin and isocyanate-terminated organopolysiloxane at one end thereof were changed in type and amount as indicated in Table 3, thereby obtaining graft copolymers.

TABLE 3

| Example | Polyvinyl Acetal Resin | Isocyanate-terminated Oranopolysiloxane at one End |
|---|---|---|
| 2 | Denka Butyral #3000-K 100 g | Synthetic Example 1 30 g |
| 3 | Denka Butyral #3000-K 100 g | Synthetic Example 2 30 g |
| 4 | Eslex BX-1 100 g | Synthetic Example 3 5 g |
| 5 | Eslex BX-1 100 g | Synthetic Example 4 20 g |
| 6 | Eslex BX-1 100 g | Synthetic Example 5 30 g |
| 7 | Denka Formal #100 100 g | Synthetic Example 1 10 g |

Note:
Eslex BX-1 is a vinyl butyral/vinyl alcohol/vinyl acetate copolymer having an average degree of polymerization of about 2,000 and available from Sekisui Chem. Ind. Co., Ltd.
Denka Formal #100 is a vinyl formal/vinyl alcohol/vinyl acetate copolymer having an average degree of polymerization of about 750 and available from Denki Chem. Ind. Co., Ltd.

EXAMPLES 8 to 14

The graft copolymer solutions obtained in Examples 1 to 7 were each diluted with a mixed solvent of methyl ethyl ketone and isopropyl alcohol with a mixing ratio by weight of 1:1 in such a way that the solid content was 5 wt %, and applied onto an Al sheet by means of a spinner, followed by drying at 100° C. for 1 minute to obtain an about 5 μm thick transparent film. The respective films obtained in this manner were subjected to measurement of a contact angle of water, a friction coefficient and adhesiveness according to the following methods, with the results shown in Table 4.

Contact angle of water: measured at 25° C. by the use of Contact Angle Meter CA-A, available from Kyowa Science Co., Ltd.

Static coefficient of friction: measured by the use of a static friction coefficient measuring instrument available from Shinto Science Co., Ltd. wherein a static coefficient of friction between test pieces was measured.

Adhesiveness: measured by a cross-hatch test wherein a sample was cross cut at pitches of 1 mm to give 100 squares and an adhesive tape was pressed against and then removed from the sample to count a remaining number of the squares.

COMPARATIVE EXAMPLES 1 and 2

Denka Butyral #3000-K and Denka Formal #100 were each dissolved in a mixed solvent of ethanol and toluene at a mixing ratio by weight of 4:6 to make a solid content of 5 wt %, followed by repeating the procedure of Examples 8 to 14, with the results shown in Table 4.

TABLE 4

| Example | Graft Copolymer | Contact Angle (degree) | Static Coefficient of Friction | Adhesiveness |
|---|---|---|---|---|
| 8 | Synthetic Example 6 | 100 | 0.20 | 100/100 |
| 9 | Synthetic Example 7 | 101 | 0.18 | 100/100 |
| 10 | Synthetic Example 8 | 93 | 0.28 | 100/100 |
| 11 | Synthetic Example 9 | 103 | 0.17 | 100/100 |
| 12 | Synthetic Example 10 | 100 | 0.20 | 100/100 |
| 13 | Synthetic Example 11 | 95 | 0.23 | 100/100 |
| 14 | Synthetic Example 12 | 100 | 0.19 | 100/100 |
| Comp. Ex. 1 | Denka Butyral #3000-K | 74 | 0.52 | 90/100 |
| Comp. Ex. 2 | Denka Formal #100 | 70 | 0.50 | 80/100 |

What is claimed is:

1. A graft copolymer which comprises a vinyl polymer selected from the group consisting of a vinyl butyral/vinyl alcohol/vinyl acetate terpolymer and a vinyl formal/vinyl alcohol/vinyl acetate terpolymer, said vinyl polymer being grafted with an organopolysiloxane.

2. A graft copolymer according to claim 1, wherein said vinyl polymer is a vinyl butyral/vinyl alcohol/vinyl acetate terpolymer.

3. A graft copolymer according to claim 1, wherein said vinyl polymer is a vinyl formal/vinyl alcohol/vinyl acetate terpolymer.

4. A graft copolymer according to claim 1, wherein said copolymer has the following general formula

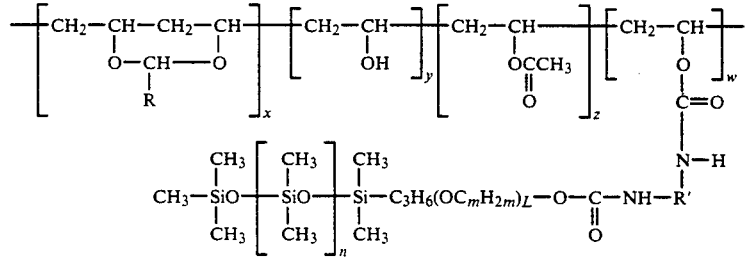

wherein R represents H or $C_3H_7$, R' represents a divalent organic group, L is an integer of from 0 to 50, m is an integer of 2 or 3, n is an integer of from 3 to 100, and $X+Y+Z+W$ is in the range of from 200 to 3000.

5. A graft copolymer according to claim 4, wherein the divalent organic group represented by R' is a member selected from the group consisting of

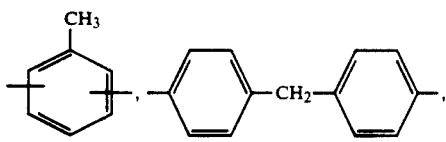

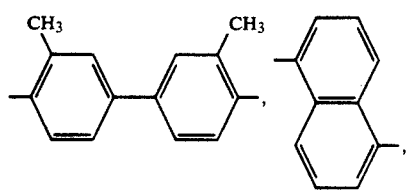

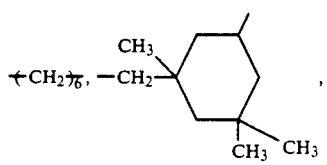

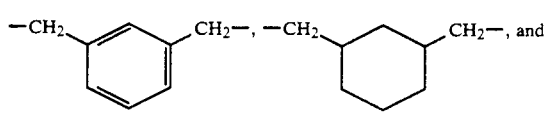

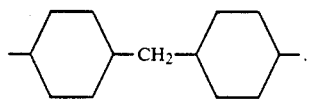

6. A graft copolymer according to claim 1, wherein said organopolysiloxane is derived from an isocyanate group-terminated organopolysiloxane at one end thereof.

7. A graft copolymer according to claim 6, wherein the isocyanate group-terminated organopolysiloxane is a compound of the following formula

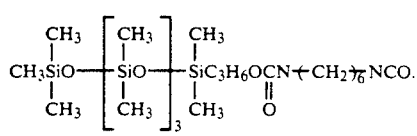

8. A graft copolymer according to claim 6, wherein the isocyanate group-terminated organopolysiloxane is a compound of the following formula

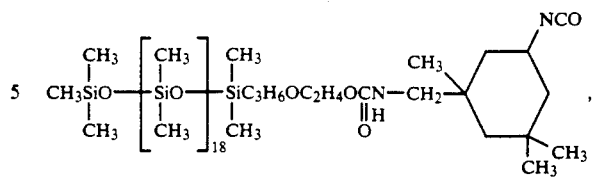

9. A graft copolymer according to claim 6, wherein the isocyanate group-terminated organopolysiloxane is a compound of the following formula

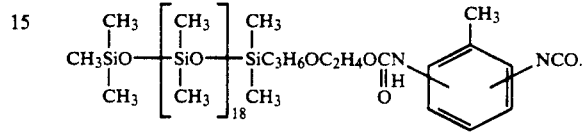

10. A graft copolymer according to claim 6, wherein the isocyanate group-terminated organopolysiloxane is a compound of the following formula

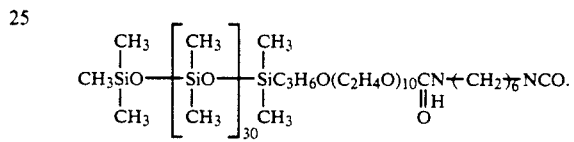

11. A graft copolymer according to claim 6, wherein the isocyanate group-terminated organopolysiloxane is a compound of the following formula

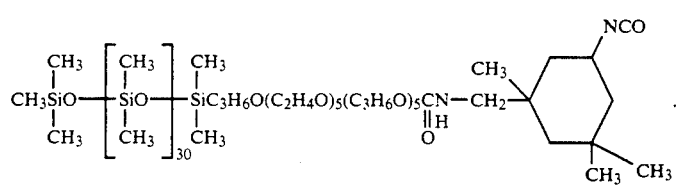

12. A graft copolymer according to claim 6, wherein the isocyanate group-terminated organopolysiloxane is a compound of the following formula

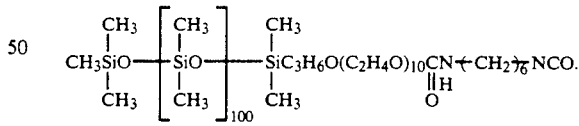

13. A graft copolymer according to claim 6, wherein the isocyanate group-terminated organopolysiloxane is a compound of the following formula

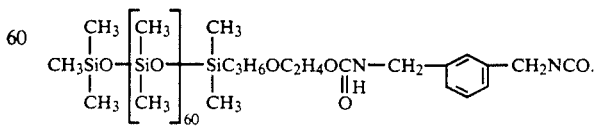

14. A coating composition which comprises a vinyl polymer selected from the group consisting of a vinyl butyral/vinyl alcohol/vinyl acetate terpolymer and a vinyl formal/vinyl alcohol/vinyl acetate terpolymer, said vinyl polymer being grafted with an organopolysiloxane.

15. A coating composition according to claim 14, wherein said graft copolymer is dissolved in a solvent.

16. A coating composition according to claim 14, wherein said vinyl polymer is a vinyl butyral/vinyl alcohol/vinyl acetate terpolymer.

17. A coating composition according to claim 14, wherein said vinyl polymer is a vinyl formal/vinyl alcohol/vinyl acetate terpolymer.

18. A coating composition according to claim 4, wherein said copolymer has the following general formula

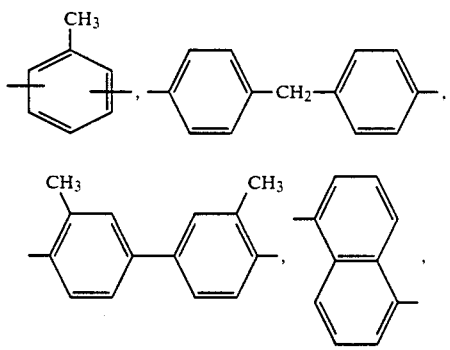

wherein R represents H or $C_3H_7$, R' represents a divalent organic group, L is an integer of from 0 to 50, m is an integer of 2 or 3, n is an integer of from 3 to 100, and $X+Y+Z+W$ is in the range of from 200 to 3000.

19. A coating composition according to claim 18, wherein the divalent organic group represented by R' is a member selected from the group consisting of

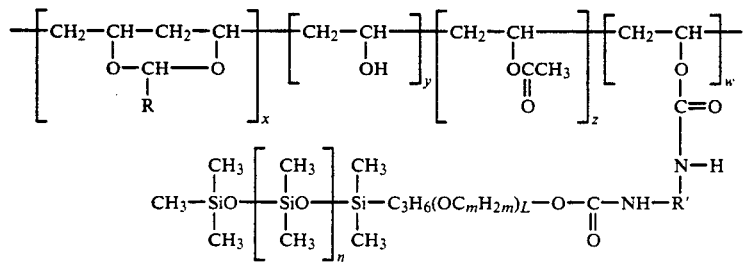

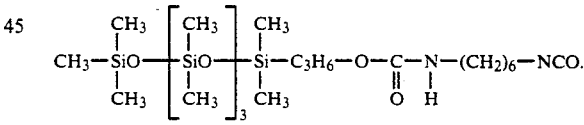

20. A coating composition according to claim 14, wherein said organopolysiloxane is derived from an isocyanate group-terminated organopolysiloxane at one end thereof.

21. A coating composition according to claim 20, wherein the isocyanate group-terminated organopolysiloxane is a compound of the following formula

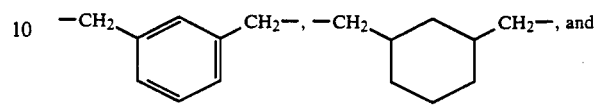

22. A coating composition according to claim 20, wherein the isocyanate group-terminated organopolysiloxane is a compound of the following formula

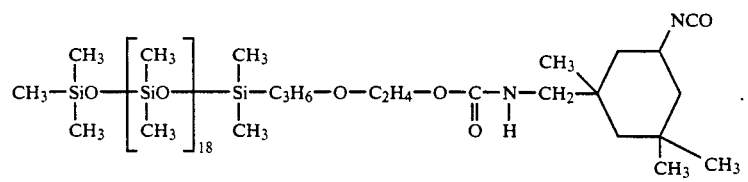

23. A coating composition according to claim 20, wherein the isocyanate group-terminated organopolysiloxane is a compound of the following formula

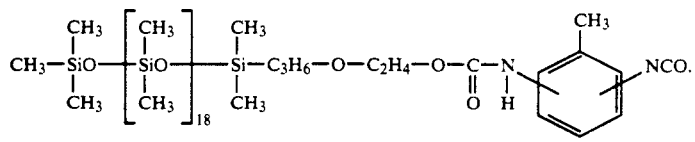

24. A coating composition according to claim 20, wherein the isocyanate group-terminated organopolysiloxane is a compound of the following formula

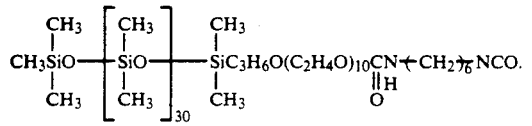

25. A coating composition according to claim 20, wherein the isocyanate group-terminated organopolysiloxane is a compound of the following formula

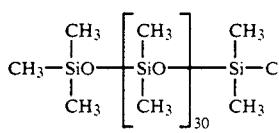

26. A coating composition according to claim 20, wherein the isocyanate group-terminated organopolysiloxane is a compound of the following formula

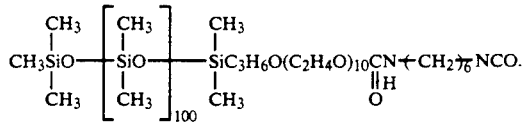

27. A coating composition according to claim 20, wherein the isocyanate group-terminated organopolysiloxane is a compound of the following formula

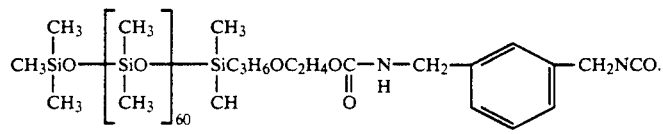

28. A coating composition according to claim 14, further comprising a polyfunctional isocyanate as a crosslinking agent in an amount of from 0.5 to 2.0 equivalents per unit equivalent of the hydroxyl group in the graft copolymer.

29. A coating composition according to claim 28, further comprising an organic tin compound for promoting crosslinkage of the graft copolymer.

* * * * *